A. STEERS.

Making Extracts.

No. 62,901.  Patented March 12, 1867.

Witnesses:  Inventor:

United States Patent Office.

ABRAHAM STEERS, OF NEW YORK, N. Y., ASSIGNOR TO HIMSELF, HENRY L. ELDER, AND S. H. KENNEDY, OF PHILADELPHIA, PENNSYLVANIA.

Letters Patent No. 62,901, dated March 12, 1867.

---

IMPROVED APPARATUS FOR MAKING EXTRACTS.

---

*The Schedule referred to in these Letters Patent and making part of the same.*

---

TO ALL WHOM IT MAY CONCERN:

Be it known that I, ABRAHAM STEERS, of the city, county, and State of New York, have invented a new and improved Apparatus for Making Extracts; and I do hereby declare that the following is a full, clear, and exact description thereof, which will enable others skilled in the art to make and use the same, reference being had to the accompanying drawing, forming part of this specification, in which—

Similar letters of reference indicate like parts.

Figure 1:
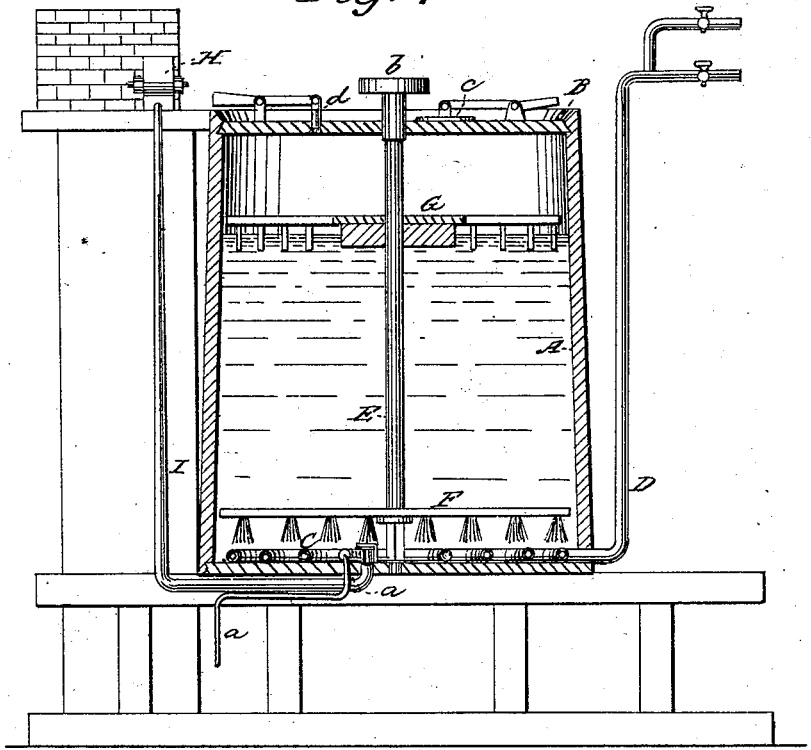
Figure 1 represents a vertical central section of this invention.
Figure 2:
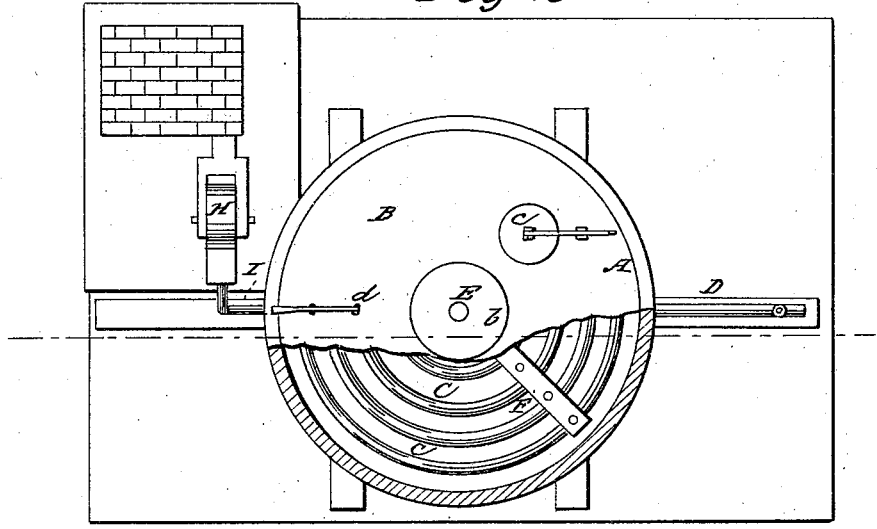
Figure 2 is a plan or top view of the same partly in section.

This invention relates to an apparatus which is intended particularly for the purpose of inspissating extracts of tan-bark or other fluids or extracts.

The invention consists in the arrangement of a revolving brush sweeping over the steam coil which is situated on the bottom of the vat or still, and serves to heat the liquid to be inspissated in such a manner that by the action of said brush the formation of a deposit on the steam coil or any part thereof is prevented, and the heat is uniformly diffused throughout the whole mass. The invention consists also in the arrangement of a floating movable rake in the vat or still containing the liquid to be inspissated, in such a manner that by the action of said rake the scum forming on the top of the liquid is broken and the vapors formed in the liquid are free to rise and to separate from the less volatile parts of said liquid, a check-valve in the top of the still being applied so as to allow the escape of the steam or vapors as soon as their pressure exceeds a certain point. The invention consists finally in injecting into the still or vat a current of heated air from below so that said air is compelled to pass through the entire mass of the liquid in the still, and that by its action the vapors forming in the liquid are readily driven off, and the inspissation is facilitated.

A represents a still or vat made of wood or any other suitable material, which is provided with a cover, B, and with a steam coil, C, on its bottom. Said coil is supplied with live or exhaust steam through a pipe, D, which is provided with suitable stop-cocks, and the condensed water forming in each coil is drawn out through a small pipe, a. Through the centre of the vat or still rises a shaft, E, to which a revolving motion is imparted by a pulley, c, or by any other suitable means. On the bottom part of this shaft is mounted a brush, F, which sweeps over the steam coil and prevents the formation of a deposit on the same. In order to compel the brush to revolve with the shaft, said shaft may be made square or polygonal, or the head of the brush may be attached to the shaft in any convenient manner. To the upper portion of the shaft E is attached a floating rake, G, which is free to rise and fall according to the quantity of liquid in the still, but which is compelled to revolve with the shaft. The central portion of the head of this rake forms a float, which, when the still is filled partially or wholly with liquid, will keep the teeth of the rake in such a position that the same sweep through the scum forming on the top of the liquid and break the same up or prevent it from congealing, and thereby the vapors forming in the body of the liquid are free to escape and the process of evaporation is considerably facilitated. The vapors forming in the still escape through the valve e, which is loaded to correspond to the desired pressure, and which may be constructed in any desirable manner, and a vacuum valve, d, prevents the still being injured by the internal pressure, if the steam or vapor in the still condenses and produces a vacuum. The formation of vapors in the liquid and their escape from the still is further facilitated by injecting into the liquid a current of hot air, said current being created by a fan-blower, F, or any other suitable mechanism, and passed into the still through a pipe, I, which enters through the bottom thereof, its mouth being protected by a suitable check-valve which prevents the liquid from the still passing down into said pipe. By the aid of this apparatus tanning liquor or any other liquid extract can be inspissated with little trouble and expense, and all danger of scorching a portion thereof, or overheating some portion while the remaining portion remains too cold, is prevented, and a pure extract is the result of this operation.

What I claim as new, and desire to secure by Letters Patent, is—

1. The revolving brush F, in combination with the still A, and coil C, constructed and operating substantially as and for the purpose described.

2. The floating rake G, in combination with the still A, constructed and operating substantially as and for the purpose set forth.

ABR'M STEERS.

Witnesses:
 WM. F. McNAMARA,
 ALEX. F. ROBERTS.